Sept. 19, 1939.     S. H. LINDBLOM     2,173,558
DETACHABLE HEEL
Filed July 2, 1938

INVENTOR:
STEN HJALMAR LINDBLOM
BY Haseltine Lake & Co.
ATTORNEYS

Patented Sept. 19, 1939

2,173,558

UNITED STATES PATENT OFFICE 2,173,558

DETACHABLE HEEL

Sten Hjalmar Lindblom, Stockholm, Sweden, assignor to Erik Vilhelm Walter Hallwyl Von Geijer, Stockholm, Sweden Application July 2, 1938, Serial No. 217,125
In Sweden January 23, 1937

2 Claims. (Cl. 36—36)

The present invention relates to shoe heels having a detachable tread piece of rubber or other elastic material, and aims at providing such a construction of means for clamping the tread piece that the tread piece may be attached and detached by simple manipulation and without professional aid, and after applying is kept in position effectively.

According to a well-known construction of detachable heels the heel comprises a member to be permanently fixed on the rear portion of the shoe, and a tread piece to be pushed on to said member. Both the fixed member serving as a support for the tread piece, and the tread piece, in this well-known construction, are made from rubber, i. e. from elastic material, and for keeping the tread piece on the support there are means on one of said members engaging clamping portions of the other thus forming a dovetail connection. At an elasticity and resiliency of the tread piece sufficient to cause the heel to be felt comfortable at walking, the portions of the tread piece and the support engaging with each other do not have the desirable stability to keep the tread piece effectively in place on the support during walking.

The disadvantage referred to is avoided by the present invention by the fact that the portions of the tread piece and the support engaging each other are made from harder material than the remainder of the tread piece. Advantageously the entire support may be made from the harder material, the clamping portions only of the tread piece being made from such material. The elasticity of the remainder of the tread piece permits simple and effective means to be performed for locking the tread piece to the support. These means may consist of a projection and a corresponding recess in which the projection is forced to engage when the tread piece has been completely pushed onto the support, the projection being maintained in its locking position due to the elasticity of the elastic portion of the tread piece.

Further characteristics and advantages of the invention are made clear in the following description of an embodiment thereof reference being had to the accompanying drawing in which Figure 1 is a plan view of a shoe heel according to the invention and shows the tread side of the heel;

Figure 1:
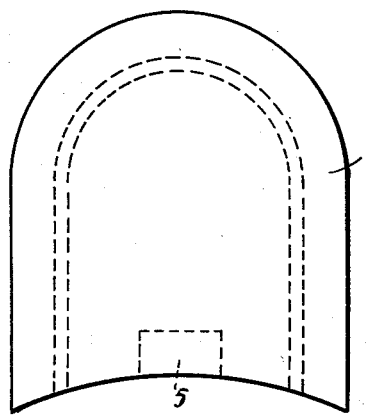
Figure 2:
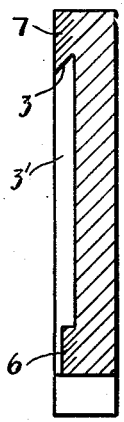
Fig. 2 is a central sectional view of the tread piece taken in the longitudinal direction thereof.

Referring to the drawing, 1 designates the outer part of the heel, i. e. the tread piece, and 2 the support thereof which is secured to the rear portion 11 of a shoe. An oblique edge surface 3 confines an open recess 3' having a dovetail cross-section in the tread piece, and a similar oblique edge surface 4 confines a correspondingly dovetail portion 4' projecting from the support, while 5 is a notch made in the support 2, and 6 designates a projection formed on the tread piece and corresponding to the notch 5.

The tread piece 1 consists substantially of elastic material, as for instance more or less soft rubber whereas the marginal portion 7 situated beyond the oblique edge surface 3 is made from harder material such as hard rubber (ebonite). Conveniently, also the projection 6 may be made from hard material such as hard rubber. The support 2 is advantageously as a whole made from harder material such as hard rubber.

Figure 3:
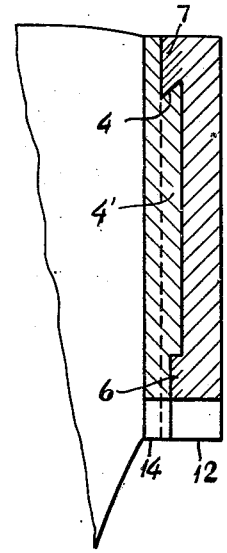
Fig. 3 is a similar, but part sectional view of the heel.
Figure 4:
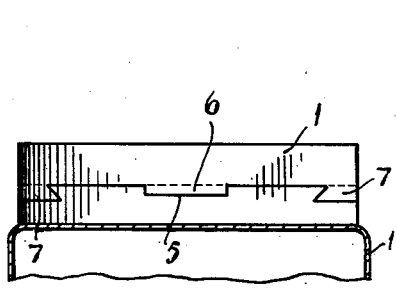
Fig. 4 is a front elevation of the heel.
Figure 5:
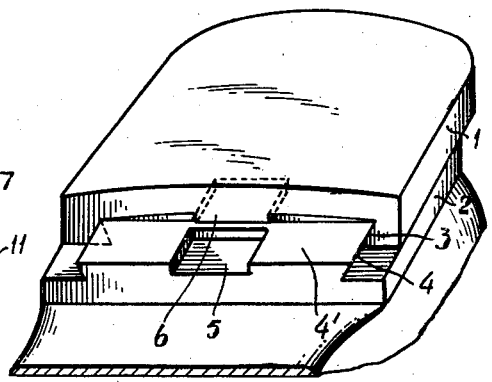
Fig. 5 is a perspective view of the heel the tread piece being pushed partly in place on the support.

The support is secured permanently on the leather heel of a shoe or directly on the rear portion of the shoe by suitable securing means such as shoe nails or by any other suitable means. The dovetail projecting portion 4' of the support 2 is adapted to fit to the inner recess 3' of the tread piece 1. The tread piece 1 may be forced in position on the support 2 from the rear end of the shoe until the front edge 12 of the tread piece is in alignment with the front 14 of the support as shown in Fig. 3. In threading the tread piece and its oblique edge to engage the oblique edge surface 4 of the support the projection 6 may be elevated to engage the bottom of the support such operation being possible due to the elasticity of the material of the tread piece. In Fig. 5 the members are shown in the position in which the projection 6 engages the bottom of the projecting portion 4' of the support. It will be noted that in this position the portion of the tread piece inside the marginal portion 7 is stretched and imparted a certain tension. Thus when the tread piece is pushed completely on to the support from the position shown in Fig. 5 the projection 6 will be forced into the notch 5 and lock the tread piece to the support.

The marginal portion 7 may be formed as a separate strip and secured to the tread piece 1, but advantageously it is moulded integrally with the remainder of the rubber tread piece which is possible if said piece is made from rubber. In the same way the projection 6 consisting of hard rubber is suitably moulded integrally with the tread piece.

The described construction of the interengaging parts 4', 7 of harder material results in the advantage of effectively keeping the tread piece in position. The construction of the support from ebonite as a whole causes the heel to be light.

A particular advantage of providing the notch 5 open at the front of the heel as particularly shown in Fig. 5 is that the introduction of the projection into the notch 5 may be controlled, and furthermore that the detachment of the tread piece is facilitated.

The invention is not limited to the construction shown in the drawing. Thus, for example, an arrangement of the projection 6 on the support and the notch 5 in the tread piece will be included in the scope of the invention.

What I claim is:

1. In shoe heels, a detachable tread piece of elastic rubber and having a hard rubber marginal portion moulded integrally with the elastic tread piece and formed with an engaging surface confining a recess of dovetail cross-section, a hard rubber support therefor to be permanently fixed on the shoe, a hard projecting portion of said support having a dovetail cross-section to engage said recess when the tread piece is pushed onto the support from the rear end of the shoe, a locking projection extending from the bottom of said recess and a notch positioned in such a relation to said projection as to be engaged thereby for locking purpose when the tread piece after elevating the projection above the projecting portion of the beforementioned support and stretching the elastic portion of the tread piece is pushed completely in position on the support.

2. In shoe heels, a detachable tread piece of elastic material having an engaging surface portion and a marginal portion of hard material disposed exteriorily of said engaging surface and confining a recess of dovetail cross-section, a support for said tread piece to be permanently fixed on the shoe, a hard projecting portion upon said support having a dovetail cross-section to engage said recess when the tread piece is pushed onto the support from the rear end of the shoe, a locking projection extending from the bottom of said recess formed with a notch open to the front of the heel and positioned in such a relation to said projection as to be engaged thereby for locking purpose when the tread piece, after elevating the projection above the projecting portion of the beforementioned support and stretching the elastic portion of the tread piece, is pushed completely in position on the support.

STEN HJALMAR LINDBLOM.